(12) United States Patent
Zimmer

(10) Patent No.: US 12,519,608 B2
(45) Date of Patent: Jan. 6, 2026

(54) ADAPTIVE CLOCK GENERATION FOR SERIAL LINKS

(71) Applicant: NVIDIA Corp., Santa Clara, CA (US)

(72) Inventor: Brian Matthew Zimmer, Sunnyvale, CA (US)

(73) Assignee: NVIDIA Corp., Santa Clara, CA (US)

( * ) Notice: Subject to any disclaimer, the term of this patent is extended or adjusted under 35 U.S.C. 154(b) by 168 days.

(21) Appl. No.: 18/492,126

(22) Filed: Oct. 23, 2023

(65) Prior Publication Data

US 2025/0132892 A1   Apr. 24, 2025

(51) Int. Cl.
*H04L 7/00* (2006.01)
*H04L 7/033* (2006.01)

(52) U.S. Cl.
CPC .......... *H04L 7/0091* (2013.01); *H04L 7/0331* (2013.01)

(58) Field of Classification Search
CPC .. G06F 1/02–16; H04L 7/0091; H04L 7/0331
USPC .......................................................... 713/501
See application file for complete search history.

(56) References Cited

U.S. PATENT DOCUMENTS

| 9,672,008 | B2 * | 6/2017 | Keller | G11C 8/16 |
| 10,630,314 | B1 * | 4/2020 | Kulkarni | H03M 9/00 |
| 12,123,911 | B1 * | 10/2024 | Gupta | G01R 31/318525 |
| 2017/0139866 | A1 * | 5/2017 | Wallace | G06F 13/4027 |
| 2019/0044553 | A1 * | 2/2019 | Bunce | H04B 1/06 |

* cited by examiner

*Primary Examiner* — Brian T Misiura
(74) *Attorney, Agent, or Firm* — Carnelian Law, LLC

(57) ABSTRACT

Adaptive clock mechanisms for serial links utilizing a delay-chain-based edge generation circuit to generate a clock that is a faster (higher-frequency) version of an incoming digital clock. The base frequency of the link clock utilized by the line transmitters is determined by the (slower) clock utilized by the digital circuitry supplying data to the line transmitters. An edge generator that may be composed of only non-synchronous circuit elements multiplies the edges of the slower clock to generate the link clock and also a clock forwarded to the receiver at a phase offset from the link clock.

20 Claims, 13 Drawing Sheets

ADAPTIVE CLOCK GENERATION FOR SERIAL LINKS

BACKGROUND

A conventional high-speed serial link clocking mechanism is depicted in FIG. 1. The digital logic on chip 1 and chip 2 operate on different clocks, clk1 and clk3, generated by clocking circuits such as a phase locked loops (PLL). The chip-to-chip physical serial link (PHY) is separately clocked by clk2.

Two asynchronous first-in-first-out memory structures (FIFOs) are utilized to communicate data in a single direction. FIFO1 is utilized for communicating data signals from the clk1 to the clk2 domain, and FIFO2 is utilized for communicating data signals from the clk2 to the clk3 domain.

The clk2 clock is utilized to provide the serial link with additional digital signal edges to increase the data transfer rate across the serial link. The clk2 signal may be generated by a PLL that oscillates at a higher frequency (e.g., 16 GHZ) compared to the digital logic (e.g., 2 GHz) that serializes the data onto and off of the link.

This conventional mechanism incurs the disadvantage of utilizing two asynchronous FIFOs, adding latency to the link and adding area and energy consumption overall. Voltage noise reduces the link margin because clk2 operates at a fixed frequency that does not adapt when the supply voltage changes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
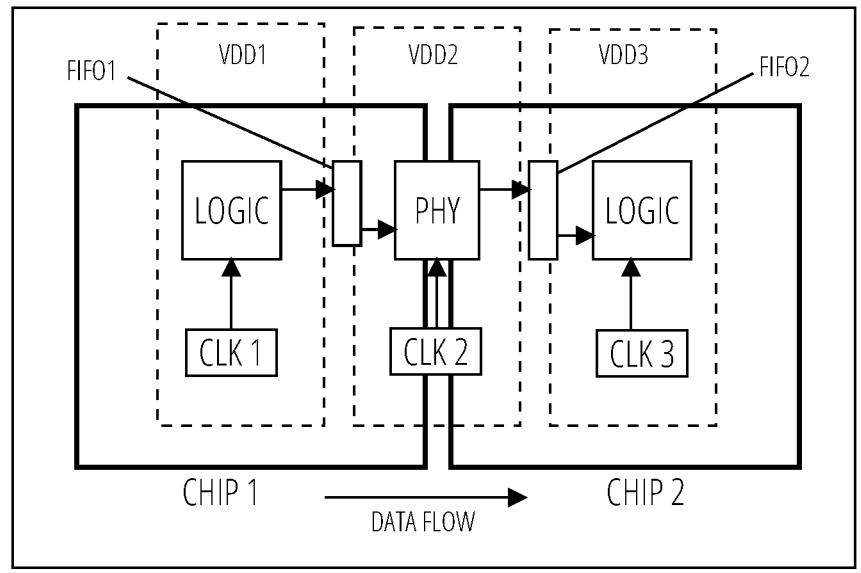
FIG. 1 depicts a conventional high-speed serial link clocking mechanism.

Adaptive clock mechanisms for serial links are disclosed utilizing a delay-chain-based edge generation circuit to generate a clock that is a faster (higher-frequency) version of an incoming digital clock. The chip-to-chip physical layer transmitter circuit (PHY) operates on the clock and voltage supply of the transmit-side chip. In other words, when communicating from chip1 to chip2, the PHY utilizes clk1 and vdd1 as a reference. The PHY operates synchronously with chip1 (the transmitter), which obviates the latency and complexity incurred by one of the asynchronous FIFOs utilized in conventional mechanisms.

The disclosed mechanisms enable higher-bandwidth serialized data communication, thus reducing the required number of inter-chip solder or wire connections to achieve a particular data communication bandwidth, while obviating many complexities of conventional approaches, such as a different PLL driving the PHY circuits, multiple power modes, and transmitter-side clock domain crossing. Power consumption is proportional to link activity and link frequency adapts based on dynamic voltage and frequency scaling (DVFS) mechanisms.

Some embodiments of the disclosed mechanisms may enable link speeds of 4-16 Gbps. The simplicity and low-area of the implementing circuits enable their application to 3D stacking technology with dense (e.g., <10 µm) bond pitches as well as to conventional packaging pitches of 25-55 µm that require lower power and low latency.

The disclosed mechanisms generate additional edges for data transmission and obviate the need to generate a clock frequency (the transmitter clk1 sets the base link clock frequency). The bandwidth of the link adapts to voltage noise and thereby improves energy efficiency.

In one aspect, a circuit in accordance with these mechanisms includes at least one line transmitter, a first clock configured to operate synchronous elements of the circuit that supply at least one line transmitter with data, and an edge generator (a circuit that doesn't include any synchronous, i.e. clocked, elements such as flops or latches) configured to generate first multiplied edges of the first clock and to apply the first multiplied edges to serializer elements of the at least one line transmitter. The edge generator may be configured to be enabled and disabled by application of a valid data signal.

In embodiments utilizing multiple line transmitters, the first multiplied edges may be applied to each of the multiple line transmitters to communicate the data in parallel across multiple serial links.

The edge generator may be configured to generate another series of multiplied edges of the first clock at a one-half unit interval phase offset of the first series of multiplied line transmitter edges. These second multiplied edges may be communicated to the receiver as a forwarded clock signal that tracks (across PVT variations) the first multiplied edges used to clock the data over the serial link(s).

The edge generator may be implemented as a plurality of serialized delay stages. One or more of the delay stages may include a configurable delay element, and one or more of the delay stages may include a pulse extender. In one implementation, alternate ones of the serialized delay stages are configured as input pairs to different latches, (e.g., each pair coupled to an S input and an R input of an SR-type latch).

Other technical features may be readily apparent to one skilled in the art from the following figures, descriptions, and claims.

Figure 2:
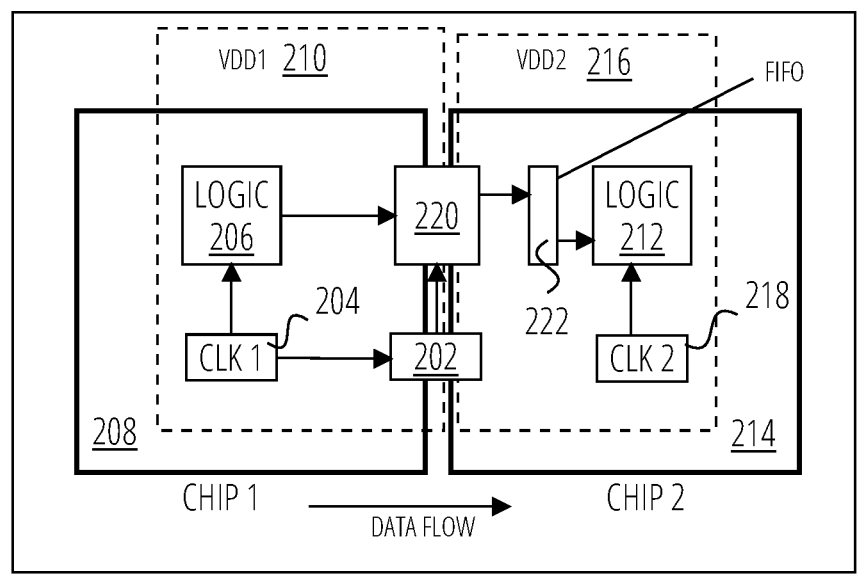
FIG. 2 depicts an embodiment of circuitry for communicating signals between different clock domains.

FIG. 2 depicts an embodiment of circuitry for communicating signals between different clock domains. Rather than an independent, dedicated clock in a separate voltage domain for operating the cross-domain link, the circuitry utilizes an edge generator 202 with a base frequency derived from the transmitter clock 204.

In the depicted example, logic 206 of chip 1 208 operating in a first voltage domain 210 of chip 1 208 communicates data signals across a serial data link to logic 212 of chip 2 214 operating in a second voltage domain 216. The logic 206 of chip 1 208 operates on a transmitter clock 204 and the logic 212 operates on a different receiver clock 218. The data passes through a physical link circuit 220 and is buffered in a FIFO 222 of chip 2 214. The physical link circuit 220 clocks data across the serial link in response to the output signals from the edge generator 202.

Figure 3A:
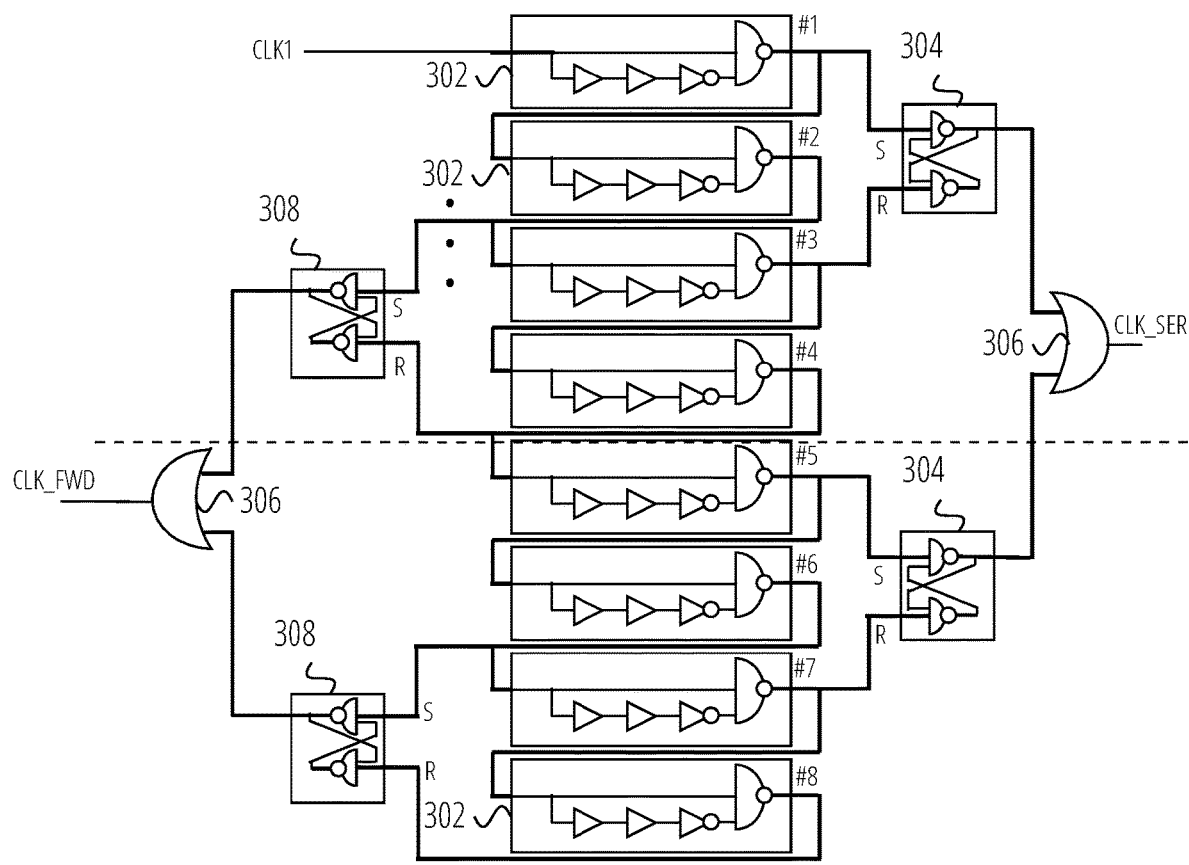
FIG. 3A depicts an example embodiment of an edge generator circuit to drive a serial data link at four times the frequency of a provided base clock signal.
Figure 3B:
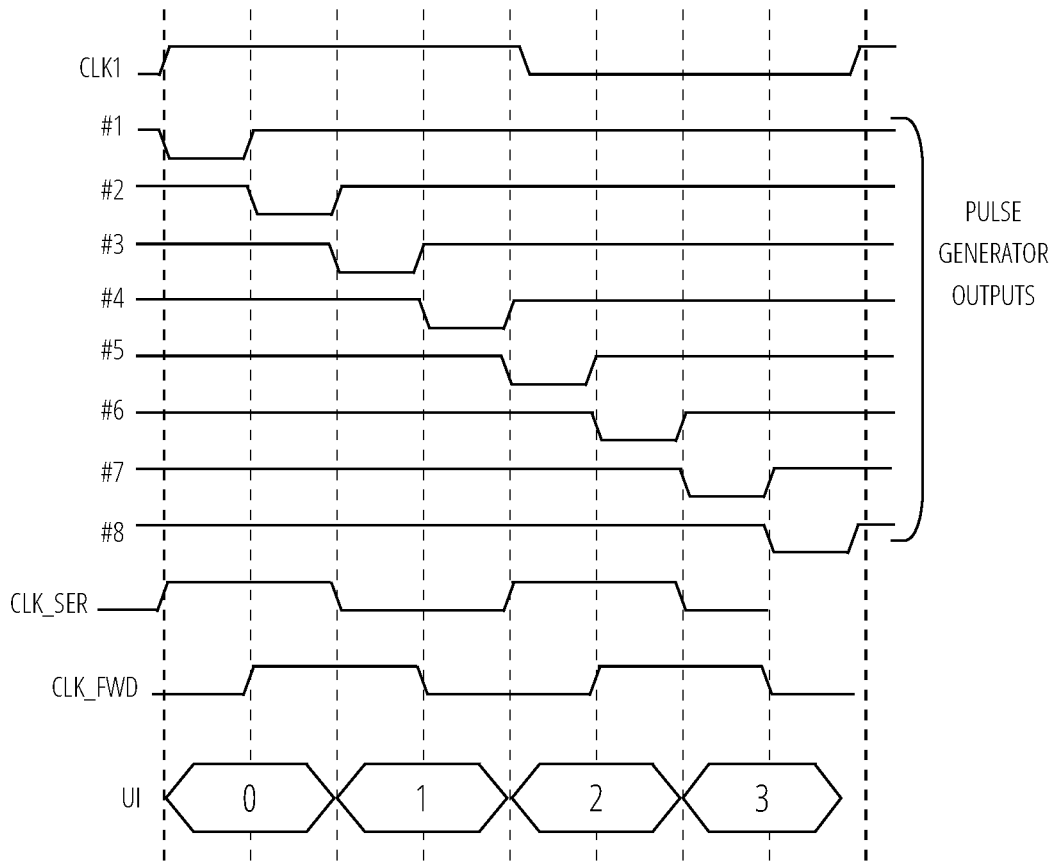
FIG. 3B depicts exemplary clocking signals generated by a circuit in accordance with the embodiment of FIG. 3A.

FIG. 3A depicts an example embodiment of an edge generator circuit to drive a serial data link at four times the frequency of a provided base clock signal CLK1. The edge generator consists of only combinatorial gates and other un-clocked standard cells (e.g., inverters), and does not consist of any synchronous elements (e.g., flops or clocked latches). FIG. 3B depicts exemplary signals generated by a circuit in accordance with the embodiment of FIG. 3A.

In the depicted example, a chain of pulse generator 302 circuits generates eight pulses (e.g., rising-edge low-pulses) from each pulse of the transmitter clock CLK1, where the trailing edge of each pulse operates as a trigger for generation of the following pulse. The clock signal CLK SER to drive the data link is generated by SR latches 304, where a 'set' pulse at latch input S triggers a rising edge of the clock and a 'reset' pulse at latch input R triggers the falling edge of the clock. Multiple rising edges per cycle are generated by ORing the outputs of pairs of SR latches with OR gates 306. The clock signal CLK_FWD that is forwarded to the receiver is generated by SR latches 308. The depicted SR latches are implemented with cross-coupled NAND gates, but other implementations may be utilized (e.g., cross-coupled NOR gates).

Both edges of CLK_SER are applied to launch the data signals on each of the serial links, and both edges of the forwarded clock CLK_FWD are applied to sample the data at the receiver. The delay implemented within the pulse generators 302 sets the width of the pulses they produce and the phase between CLK_SER and CLK_FWD, e.g., 0.5 unit intervals (UI) in the depicted example. Depending on the sampler (e.g., if setup and hold time are very different), there may be an advantage to biasing the phase to one side or the other of the midpoint of the UI. In general, the phase offset may be set by configuring the odd vs even pulse generator 302 stages with different delays.

Utilizing this mechanism results in the transmitted data being sampled in the middle of the eye window for the unit interval across process, voltage, and temperature (PVT) variations. For example, if transistors of standard cells utilized in the transmitter, receiver, PHY, or other components involved in the data transfer speed up or slow down due to PVT variations, the delay before and after the sampling edge moves identically, as it is generated by identically-structured circuits. The overall delay between receipt of an incoming clock edge and the last pulse generated in response by the pulse generators 302 (the critical path) of the system will change with PVT, but will evolve in sync with the delay along other digital paths in the system.

After all the pulses are generated in response to a received edge of CLK1, CLK_SER and CLK_FWD remain at 0V until the next rising CLK1 edge arrives. For invalid data, CLK1 may be gated at 0 for that cycle and all clock distribution will be automatically postponed until valid data is received, conserving power. CLK1 may be gated using any of a number of well-known mechanisms.

Different multiplication ratios of the base clock signal CLK1 may be implemented by varying the number of pulse generators 302. For example, a 2× data rate may be implemented by removing the logic below the dashed line in FIG. 3A, thereby providing the bandwidth achieved by conventional Double Data Rate (DDR) mechanisms, but with higher immunity to duty cycle variation of the base clock CLK1, because the falling edge of CLK1 is not used to generate the sampling edge of the forwarded clock CLK_FWD.

Figure 4A:
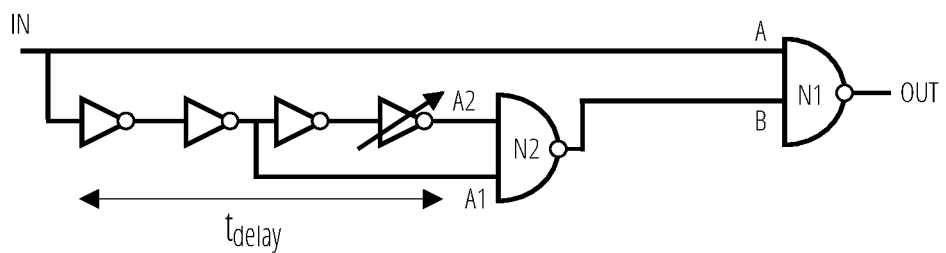
FIG. 4A and FIG. 4B depict an example rising-edge low-pulse generation stage and waveforms.
Figure 4B:
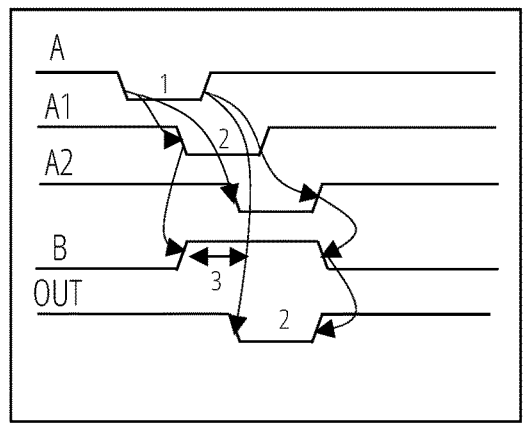

FIG. 4A and FIG. 4B depict an example rising-edge low-pulse generation stage and waveforms. In the depicted embodiment, when a rising edge arrives, a low pulse is generated at the output (the output is pulled low for the pulse interval), where the pulse interval (width) is configured by setting $t_{delay}$.

The output signal OUT of the circuit of FIG. 4A does not respond to falling edges of the input signal IN. In response to a rising edge of IN, an initial (falling) edge of the low pulse OUT is generated. After the time $t_{delay}$, the output OUT rises and completes the low pulse.

The gate N2 protects against the corner case where $t_{delay} > t_{delay,\ prior}$ by stretching the high pulse on B. If a simple inverter were used in place of N2 and the incoming pulse $t_{delay,\ prior}$ was too narrow, the rising edge of $t_{delay,prior}$ would be unable to trigger OUT=0 as intended because B would still equal 0.

Other implementations and variations of a pulse generation stage will be evident to those of ordinary skill in the art. For example, the delay elements may be implemented with simple inverters, tri-state inverters, inverters with additional load, NAND/NOR gates, standard cells utilizing different transistor thresholds, and so on. Ideally, the delay satisfies the constraints of the critical path of the transmitter logic, PHY, and/or receiver logic. To control the pulse width after design time (to support different frequency designs, or calibrate to process corner), of the elements may implement a tunable signal propagation delay. There are many circuits known in the art providing a tunable signal propagation delay, such as using a multiplexer to select a different number of signal propagation stages.

Figure 5A:
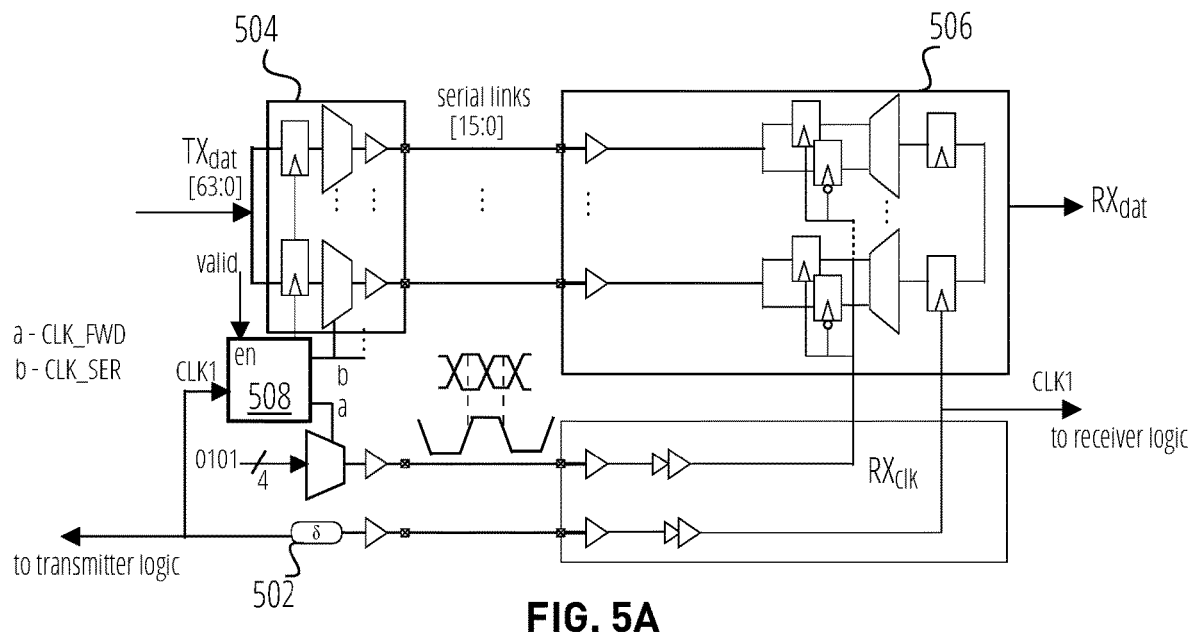
FIG. 5A and FIG. 5B depict an example link architecture in accordance with the disclosed clock generation mechanisms, and corresponding waveforms.
Figure 5B:
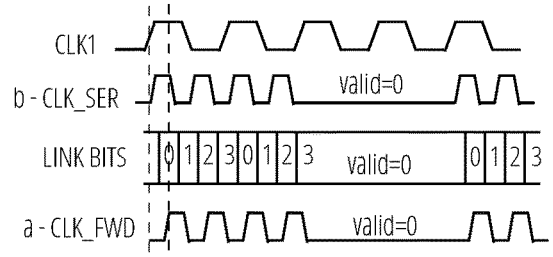

FIG. 5A and FIG. 5B depict an example link architecture in accordance with the disclosed clock generation mechanisms, and corresponding waveforms. The function of various depicted standard cells and circuits (flops, latches, muxes, and drivers/buffers), if not elaborated on, will be evident to those of ordinary skill in the art. Some of the buffers/drivers may be inverting, as appropriate to the implementation.

In the depicted embodiment, data bits and a transmitter clock signal CLK1 (generated by phase locked loop 502) are input to the link transmitters 504 (also referred to herein as 'line transmitters') over a 64-bit data bus and transmitter clock bus, respectively. The edge generator 508 produces a link clock (CLK_SER) comprising multiple rising and falling edges per each rising edge of the input transmitter clock CLK1. The link transmitters 504 communicate data bits to the link receivers 506 over the serial links (also called "lines" herein). The link transmitters 504 and link receivers 506 may be implemented in a physical link circuit 220 (PHY) chip, for example. In some embodiments, the PHY also comprises the edge generator 508. Due to the faster link speeds, the transmitter-side FIFO may be obviated.

The CLK_SER clock is applied to serialize the data bits across multiple serial links (16 parallel serial links in this example). The edge generator 508 produces a second, forwarded clock signal CLK_FWD at a 0.5 UI phase offset from CLK_SER. The propagation of the CLK_FWD signal across the links is delay-matched with the propagation of the data bits across the links. The link receivers 506 apply CLK_FWD to sample the data bits, and due to the delay matching and 0.5 UI phase offset of CLK_FWD from CLK_SER, the data bits are sampled in the middle of their setup and hold time window (the sampling eye).

The forwarded clock CLK_FWD is communicated on each edge of CLK_SER along with (in this example) 16 data bits. The forward path for CLK_FWD may be delay matched in terms of layout and devices to the link paths.

The edge generator 508 may be disabled when invalid data bits or no data bits are present, so that no CLK_SER or CLK_FWD edges are generated, and the links draw no additional power while the invalid/missing data condition persists. In this manner, power is conserved for workloads that utilize low communication activity between chips.

Embodiments in accordance with these mechanisms may exhibit improved immunity to voltage noise and reduced voltage margins over conventional mechanisms. For example, in response to a supply voltage droop, the edge generator 508 responds by reducing the frequency of CLK_SER and CLK_FWD. With conventional PLL clocking of the chip-to-chip link, the UI width is fixed, and the edges arrive at the same absolute time apart and don't track variations in the supply voltage, even though the transistors implementing the various components exhibit a change in response time due to such variations.

Figure 6:
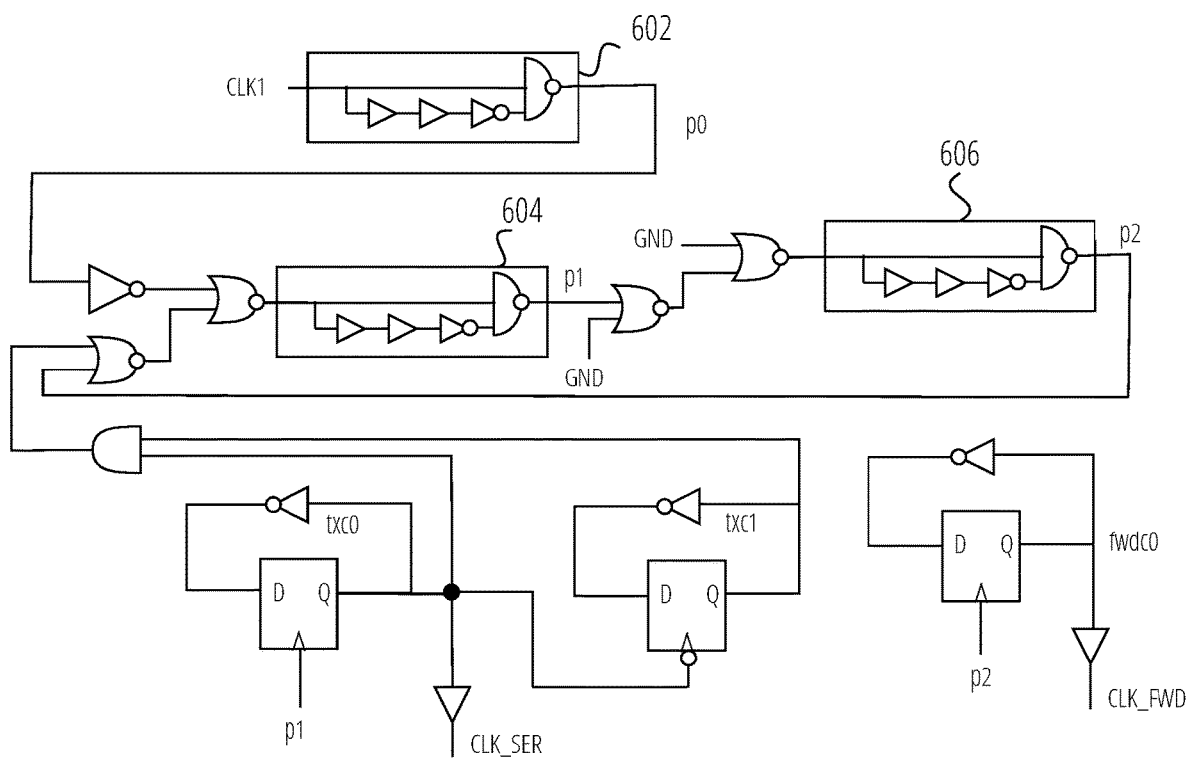
FIG. 6 depicts an alternative embodiment of a link clocking circuit.

FIG. 6 depicts an alternative embodiment of a link clocking circuit. Pulse elements are utilized multiple times within one transmitter clock (CLK1) cycle, and using a counter to control a desired number of pulses to generate.

Due to the close-loop nature of this embodiment, it may be implemented in lower circuit area and with fewer total delay elements than the open-loop link clocking circuit embodiments described previously. Additionally, the worst-case variation in the unit interval is lower due to the utilization of fewer circuit elements.

The first pulse generator 602 transforms the rising edge of the transmitter clock into a negative pulse, enabling subsequent circuit elements to operate independently of the duty cycle of the transmitter clock. The width of the pulse generated by the first pulse generator 602 reflects the additional setup time between the incoming transmitter clock and the first fast clock edge (e.g., to case constraints on the critical path in the serializer).

The second-stage pulse generator 604 is a rising edge-triggered negative pulse generator, with an input signal p0 AND (p2 OR (txc1 AND txc0)). This input logic may be implemented using two NOR gates as depicted in FIG. 6 to reduce transistor count over other logic implementations.

The nodes txc1, txc0 and fwdc0 may be reset initially to logic 1. When CLK1 is low, p1 and p2 are high. Therefore at the start of the cycle, p2 is high, and both of txc1 and txc0 are high. The negative pulse p0 triggers the second-stage pulse generator 604 to generate p1 on the rising edge. The p1 rising edge triggers the third-stage pulse generator 606 to generate p2.

The pair of NOR gates between the pulse generator 604 and the pulse generator 606 provide delay matching between the two pulses. Signal p2 is fed back to the pulse generator 604 so that the rising edge of p2 triggers the next falling edge p1. If (txc1 AND txc0) remains low, p1 and p2 remain in constant oscillation.

To terminate the oscillation after a desired number of link clock (CLK_SER) and forward clock (CLK_FWD) edges have been generated (e.g., after 4 pulses in the embodiment of FIG. 6), txc1 and txc0 are generated by a ripple divider triggered by the falling edge of p1. For example, in the depicted example after 4 falling edges of p1, the state of txc<1:0>=2'b11, a condition that prevents p2 from generating a continuing oscillation. Oscillation resumes with the next edge of CLK1, causing p0 to go low again. The state of txc<1:0> rolls over to 2'b00 to initiate counting up to 4 again. The link clock is generated by the ripple divider from the falling edges of p1, and the forwarded clock is generated by another ripple divider from the falling edges of p2.

Figure 7A:
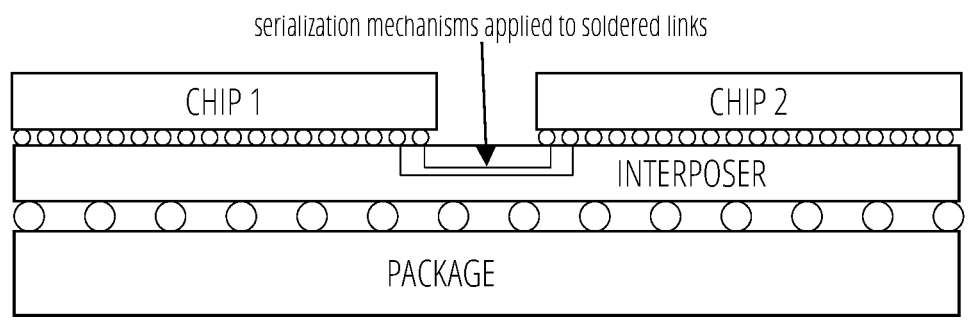
FIG. 7A and FIG. 7B depict exemplary use cases of the disclosed mechanisms with 2.5D chip-to-chip interconnects and 3D stacking layouts.
Figure 7B:
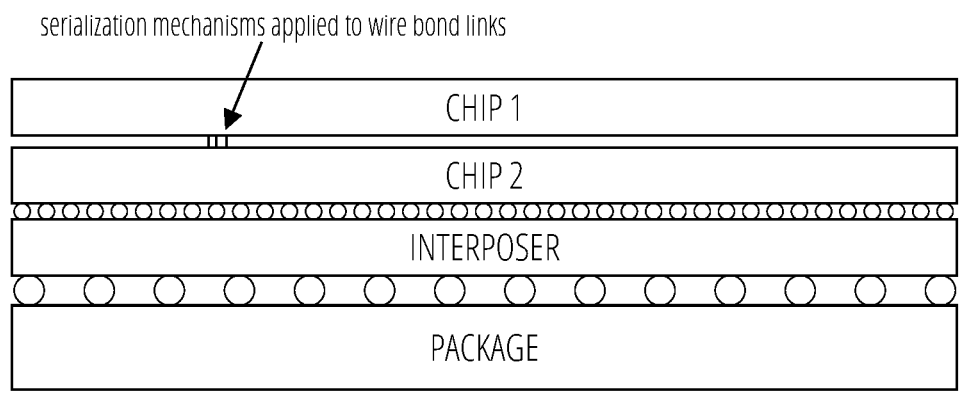

The proposed adaptive clock generation may be utilized in devices and circuit arrangements that communicate multiple bits of data over a wire during a single clock period of the transmitter and/or receiver logic. The disclosed mechanisms enable higher-bandwidth serialized data communication, thus reducing the required number of inter-chip solder bump or bonding wire connections to achieve a particular data communication bandwidth. FIG. 7A and FIG. 7B depict exemplary use cases of the disclosed mechanisms with 2.5D chip-to-chip interconnects (with dense solder bump layouts) and 3D stacking layouts (with dense wire bonding), respectively. The disclosed mechanisms may also be utilized to serialize data over on-chip data wires under dense routing constraints (e.g., between parallel processing units of a graphics processing unit, and/or between a parallel processing unit and a memory circuit, memory chip, or package-see below).

The mechanisms disclosed herein may be utilized in devices comprising one or more graphic processing unit (GPU) and/or general purpose data processor (e.g., a 'central processing unit or CPU). Exemplary architectures will now be described that may be configured with the disclosed mechanisms, which may generally be applied as a data communication interface between any of the components described in conjunction with the following description.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 8:
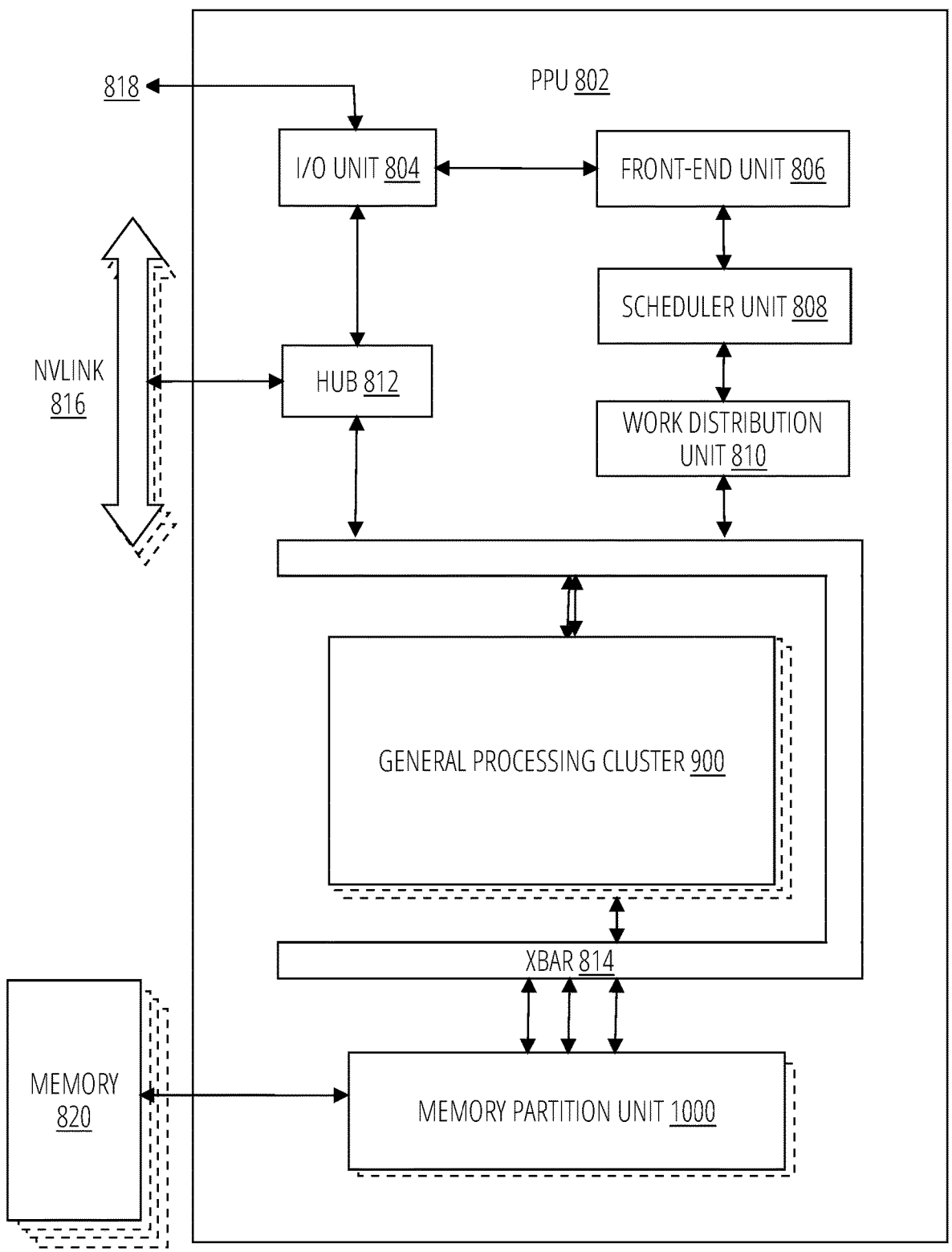
FIG. 8 depicts a parallel processing unit in accordance with one embodiment.

FIG. 8 depicts a parallel processing unit 802, in accordance with an embodiment. In an embodiment, the parallel processing unit 802 is a multi-threaded processor that is implemented on one or more integrated circuit devices. The parallel processing unit 802 is a latency hiding architecture designed to process many threads in parallel. A thread (e.g., a thread of execution) is an instantiation of a set of instructions configured to be executed by the parallel processing unit 802. In an embodiment, the parallel processing unit 802 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 802 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 802 modules may be configured to accelerate thousands of High Performance Computing (HPC), data center, and machine learning applications. The parallel processing unit 802 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the parallel processing unit 802 includes an I/O unit 804, a front-end unit 806, a scheduler unit 808, a work distribution unit 810, a hub 812, a crossbar 814, one or more general processing cluster 900 modules, and one or more memory partition unit 1000 modules. The parallel processing unit 802 may be connected to a host processor or other parallel processing unit 802 modules via one or more high-speed NVLink 816 interconnects. The parallel processing unit 802 may be connected to a host processor or other peripheral devices via an interconnect 818. The parallel processing unit 802 may also be connected to a local memory comprising a number of memory 820 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 820 may comprise logic to configure the parallel processing unit 802 to carry out aspects of the techniques disclosed herein.

The NVLink 816 interconnect enables systems to scale and include one or more parallel processing unit 802 modules combined with one or more CPUs, supports cache coherence between the parallel processing unit 802 modules and CPUs, and CPU mastering. Data and/or commands may be transmitted by the NVLink 816 through the hub 812 to/from other units of the parallel processing unit 802 such as one or more copy engines, a video encoder, a video decoder, a power management unit, etc. (not explicitly shown). The NVLink 816 is described in more detail in conjunction with FIG. 12.

The I/O unit 804 is configured to transmit and receive communications (e.g., commands, data, etc.) from a host processor (not shown) over the interconnect 818. The I/O unit 804 may communicate with the host processor directly via the interconnect 818 or through one or more intermediate devices such as a memory bridge. In an embodiment, the I/O unit 804 may communicate with one or more other processors, such as one or more parallel processing unit 802 modules via the interconnect 818. In an embodiment, the I/O unit 804 implements a Peripheral Component Interconnect Express (PCIe) interface for communications over a PCIe bus and the interconnect 818 is a PCIe bus. In alternative embodiments, the I/O unit 804 may implement other types of well-known interfaces for communicating with external devices.

The I/O unit 804 decodes packets received via the interconnect 818. In an embodiment, the packets represent commands configured to cause the parallel processing unit 802 to perform various operations. The I/O unit 804 transmits the decoded commands to various other units of the parallel processing unit 802 as the commands may specify. For example, some commands may be transmitted to the front-end unit 806. Other commands may be transmitted to the hub 812 or other units of the parallel processing unit 802 such as one or more copy engines, a video encoder, a video decoder, a power management unit, etc. (not explicitly shown). In other words, the I/O unit 804 is configured to route communications between and among the various logical units of the parallel processing unit 802.

In an embodiment, a program executed by the host processor encodes a command stream in a buffer that provides workloads to the parallel processing unit 802 for processing. A workload may comprise several instructions and data to be processed by those instructions. The buffer is a region in a memory that is accessible (e.g., read/write) by both the host processor and the parallel processing unit 802. For example, the I/O unit 804 may be configured to access the buffer in a system memory connected to the interconnect 818 via memory requests transmitted over the interconnect 818. In an embodiment, the host processor writes the command stream to the buffer and then transmits a pointer to the start of the command stream to the parallel processing unit 802. The front-end unit 806 receives pointers to one or more command streams. The front-end unit 806 manages the one or more streams, reading commands from the streams and forwarding commands to the various units of the parallel processing unit 802.

The front-end unit 806 is coupled to a scheduler unit 808 that configures the various general processing cluster 900 modules to process tasks defined by the one or more streams. The scheduler unit 808 is configured to track state information related to the various tasks managed by the scheduler unit 808. The state may indicate which general processing cluster 900 a task is assigned to, whether the task is active or inactive, a priority level associated with the task, and so forth. The scheduler unit 808 manages the execution of a plurality of tasks on the one or more general processing cluster 900 modules.

The scheduler unit 808 is coupled to a work distribution unit 810 that is configured to dispatch tasks for execution on the general processing cluster 900 modules. The work distribution unit 810 may track a number of scheduled tasks received from the scheduler unit 808. In an embodiment, the work distribution unit 810 manages a pending task pool and an active task pool for each of the general processing cluster 900 modules. The pending task pool may comprise a number of slots (e.g., 32 slots) that contain tasks assigned to be processed by a particular general processing cluster 900. The active task pool may comprise a number of slots (e.g., 4 slots) for tasks that are actively being processed by the general processing cluster 900 modules. As a general processing cluster 900 finishes the execution of a task, that task is evicted from the active task pool for the general processing cluster 900 and one of the other tasks from the pending task pool is selected and scheduled for execution on the general processing cluster 900. If an active task has been idle on the general processing cluster 900, such as while waiting for a data dependency to be resolved, then the active task may be evicted from the general processing cluster 900 and returned to the pending task pool while another task in the pending task pool is selected and scheduled for execution on the general processing cluster 900.

The work distribution unit 810 communicates with the one or more general processing cluster 900 modules via crossbar 814. The crossbar 814 is an interconnect network that couples many of the units of the parallel processing unit 802 to other units of the parallel processing unit 802. For example, the crossbar 814 may be configured to couple the work distribution unit 810 to a particular general processing cluster 900. Although not shown explicitly, one or more other units of the parallel processing unit 802 may also be connected to the crossbar 814 via the hub 812.

The tasks are managed by the scheduler unit 808 and dispatched to a general processing cluster 900 by the work distribution unit 810. The general processing cluster 900 is configured to process the task and generate results. The results may be consumed by other tasks within the general processing cluster 900, routed to a different general processing cluster 900 via the crossbar 814, or stored in the memory 820. The results can be written to the memory 820 via the memory partition unit 1000 modules, which implement a memory interface for reading and writing data to/from the memory 820. The results can be transmitted to another parallel processing unit 802 or CPU via the NVLink 816. In an embodiment, the parallel processing unit 802 includes a number U of memory partition unit 1000 modules that is equal to the number of separate and distinct memory 820 devices coupled to the parallel processing unit 802. A memory partition unit 1000 will be described in more detail below in conjunction with FIG. 10.

In an embodiment, a host processor executes a driver kernel that implements an application programming interface (API) that enables one or more applications executing on the host processor to schedule operations for execution on the parallel processing unit 802. In an embodiment, multiple compute applications are simultaneously executed by the parallel processing unit 802 and the parallel processing unit 802 provides isolation, quality of service (QoS), and independent address spaces for the multiple compute applications. An application may generate instructions (e.g., API calls) that cause the driver kernel to generate one or more tasks for execution by the parallel processing unit 802. The driver kernel outputs tasks to one or more streams being processed by the parallel processing unit 802. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 11.

Figure 9:
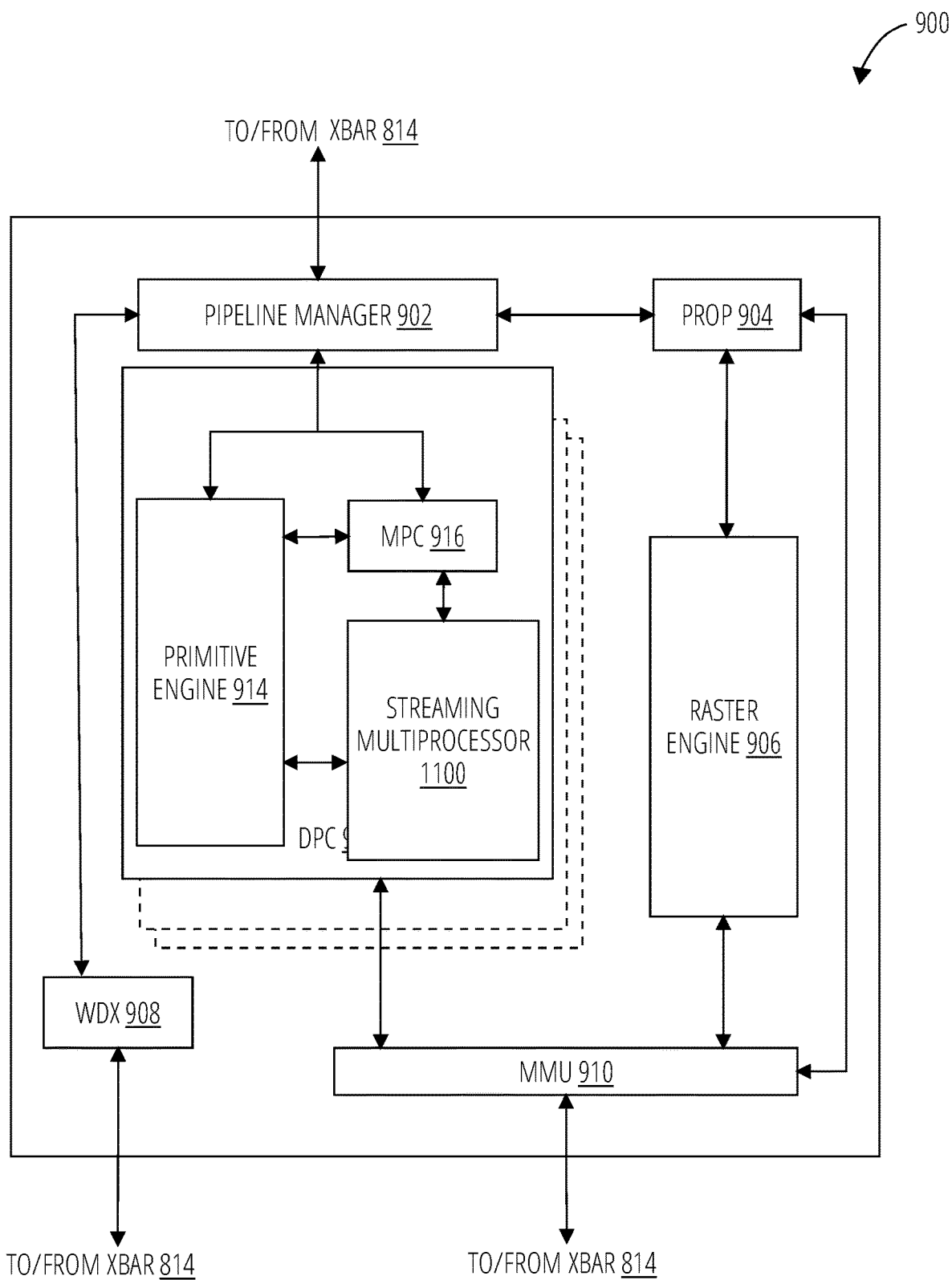
FIG. 9 depicts a general processing cluster in accordance with one embodiment.

FIG. 9 depicts a general processing cluster 900 of the parallel processing unit 802 of FIG. 8, in accordance with an embodiment. As shown in FIG. 9, each general processing cluster 900 includes a number of hardware units for processing tasks. In an embodiment, each general processing cluster 900 includes a pipeline manager 902, a pre-raster operations unit 904, a raster engine 906, a work distribution crossbar 908, a memory management unit 910, and one or more data processing cluster 912. It will be appreciated that the general processing cluster 900 of FIG. 9 may include other hardware units in lieu of or in addition to the units shown in FIG. 9.

In an embodiment, the operation of the general processing cluster 900 is controlled by the pipeline manager 902. The pipeline manager 902 manages the configuration of the one or more data processing cluster 912 modules for processing tasks allocated to the general processing cluster 900. In an embodiment, the pipeline manager 902 may configure at least one of the one or more data processing cluster 912 modules to implement at least a portion of a graphics rendering pipeline. For example, a data processing cluster 912 may be configured to execute a vertex shader program on the programmable streaming multiprocessor 1100. The pipeline manager 902 may also be configured to route packets received from the work distribution unit 810 to the appropriate logical units within the general processing cluster 900. For example, some packets may be routed to fixed function hardware units in the pre-raster operations unit 904 and/or raster engine 906 while other packets may be routed to the data processing cluster 912 modules for processing by the primitive engine 914 or the streaming multiprocessor 1100. In an embodiment, the pipeline manager 902 may configure at least one of the one or more data processing cluster 912 modules to implement a neural network model and/or a computing pipeline.

Figure 10:
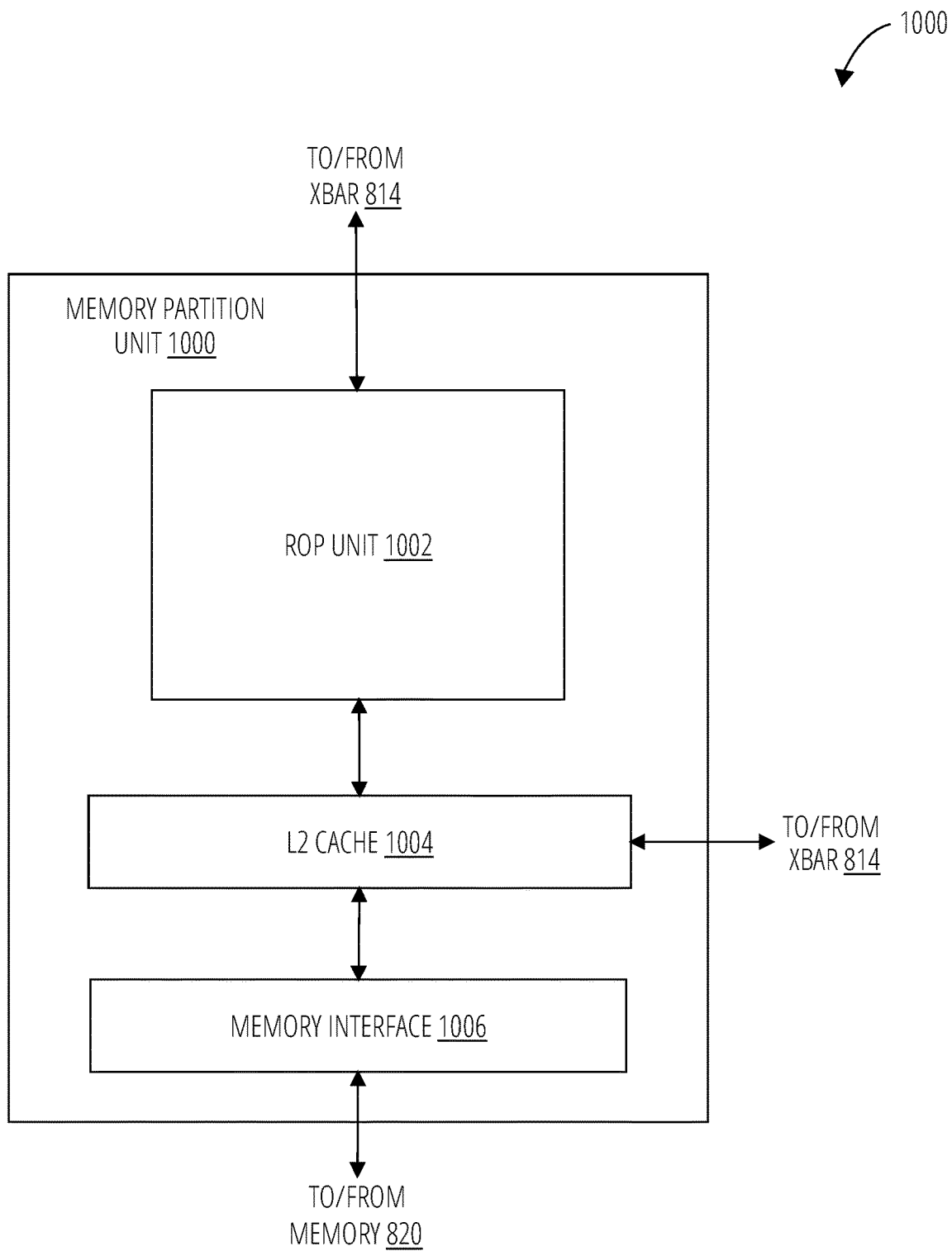
FIG. 10 depicts a memory partition unit in accordance with one embodiment.

The pre-raster operations unit 904 is configured to route data generated by the raster engine 906 and the data processing cluster 912 modules to a Raster Operations (ROP) unit, described in more detail in conjunction with FIG. 10. The pre-raster operations unit 904 may also be configured to perform optimizations for color blending, organize pixel data, perform address translations, and the like.

The raster engine 906 includes a number of fixed function hardware units configured to perform various raster operations. In an embodiment, the raster engine 906 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 906 comprises fragments to be processed, for example, by a fragment shader implemented within a data processing cluster 912.

Each data processing cluster 912 included in the general processing cluster 900 includes an M-pipe controller 916, a primitive engine 914, and one or more streaming multiprocessor 1100 modules. The M-pipe controller 916 controls the operation of the data processing cluster 912, routing packets received from the pipeline manager 902 to the appropriate units in the data processing cluster 912. For example, packets associated with a vertex may be routed to the primitive engine 914, which is configured to fetch vertex attributes associated with the vertex from the memory 820. In contrast, packets associated with a shader program may be transmitted to the streaming multiprocessor 1100.

The streaming multiprocessor 1100 comprises a programmable streaming processor that is configured to process tasks represented by a number of threads. Each streaming multiprocessor 1100 is multi-threaded and configured to execute a plurality of threads (e.g., 32 threads) from a particular group of threads concurrently. In an embodiment, the streaming multiprocessor 1100 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1100 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1100 will be described in more detail below in conjunction with FIG. 11.

The memory management unit 910 provides an interface between the general processing cluster 900 and the memory partition unit 1000. The memory management unit 910 may provide translation of virtual addresses into physical addresses, memory protection, and arbitration of memory requests. In an embodiment, the memory management unit 910 provides one or more translation lookaside buffers (TLBs) for performing translation of virtual addresses into physical addresses in the memory 820.

FIG. 10 depicts a memory partition unit 1000 of the parallel processing unit 802 of FIG. 8, in accordance with an embodiment. As shown in FIG. 10, the memory partition unit 1000 includes a raster operations unit 1002, a level two cache 1004, and a memory interface 1006. The memory interface 1006 is coupled to the memory 820. Memory interface 1006 may implement 32, 64, 128, 1024-bit data buses, or the like, for high-speed data transfer. In an embodiment, the parallel processing unit 802 incorporates U memory interface 1006 modules, one memory interface 1006 per pair of memory partition unit 1000 modules, where each pair of memory partition unit 1000 modules is connected to a corresponding memory 820 device. For example, parallel processing unit 802 may be connected to up to Y memory 820 devices, such as high bandwidth memory stacks or graphics double-data-rate, version 5, synchronous dynamic random access memory, or other types of persistent storage.

In an embodiment, the memory interface 1006 implements an HBM2 memory interface and Y equals half U. In an embodiment, the HBM2 memory stacks are located on the same physical package as the parallel processing unit 802, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 820 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 802 modules process very large datasets and/or run applications for extended periods.

In an embodiment, the parallel processing unit 802 implements a multi-level memory hierarchy. In an embodiment, the memory partition unit 1000 supports a unified memory to provide a single unified virtual address space for CPU and parallel processing unit 802 memory, enabling data sharing between virtual memory systems. In an embodiment the frequency of accesses by a parallel processing unit 802 to memory located on other processors is traced to ensure that memory pages are moved to the physical memory of the parallel processing unit 802 that is accessing the pages more frequently. In an embodiment, the NVLink 816 supports address translation services allowing the parallel processing unit 802 to directly access a CPU's page tables and providing full access to CPU memory by the parallel processing unit 802.

In an embodiment, copy engines transfer data between multiple parallel processing unit 802 modules or between parallel processing unit 802 modules and CPUs. The copy engines can generate page faults for addresses that are not mapped into the page tables. The memory partition unit 1000 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 820 or other system memory may be fetched by the memory partition unit 1000 and stored in the level two cache 1004, which is located on-chip and is shared between the various general processing cluster 900 modules. As shown, each memory partition unit 1000 includes a portion of the level two cache 1004 associated with a corresponding memory 820 device. Lower level caches may then be implemented in various units within the general processing cluster 900 modules. For example, each of the streaming multiprocessor 1100 modules may implement an L1 cache. The L1 cache is private memory that is dedicated to a particular streaming multiprocessor 1100. Data from the level two cache 1004 may be fetched and stored in each of the L1 caches for processing in the functional units of the streaming multiprocessor 1100 modules. The level two cache 1004 is coupled to the memory interface 1006 and the crossbar 814.

The raster operations unit 1002 performs graphics raster operations related to pixel color, such as color compression, pixel blending, and the like. The raster operations unit 1002 also implements depth testing in conjunction with the raster engine 906, receiving a depth for a sample location associated with a pixel fragment from the culling engine of the raster engine 906. The depth is tested against a corresponding depth in a depth buffer for a sample location associated with the fragment. If the fragment passes the depth test for the sample location, then the raster operations unit 1002 updates the depth buffer and transmits a result of the depth test to the raster engine 906. It will be appreciated that the number of partition memory partition unit 1000 modules may be different than the number of general processing cluster 900 modules and, therefore, each raster operations unit 1002 may be coupled to each of the general processing cluster 900 modules. The raster operations unit 1002 tracks packets received from the different general processing cluster 900 modules and determines which general processing cluster 900 that a result generated by the raster operations unit 1002 is routed to through the crossbar 814. Although the raster operations unit 1002 is included within the memory partition unit 1000 in FIG. 10, in other embodiment, the raster operations unit 1002 may be outside of the memory partition unit 1000. For example, the raster operations unit 1002 may reside in the general processing cluster 900 or another unit.

Figure 11:
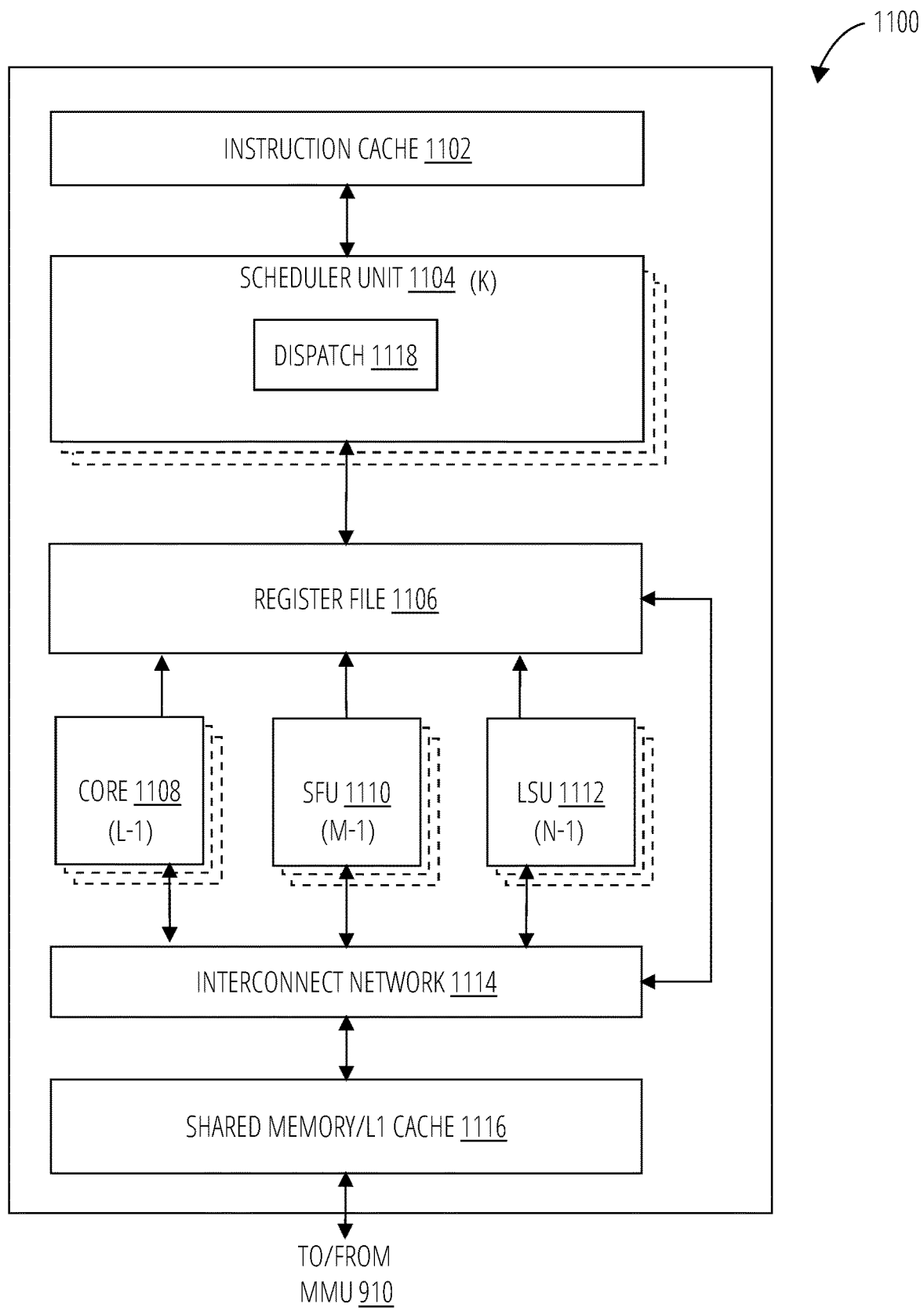
FIG. 11 depicts a streaming multiprocessor in accordance with one embodiment.

FIG. 11 illustrates the streaming multiprocessor 1100 of FIG. 9, in accordance with an embodiment. As shown in FIG. 11, the streaming multiprocessor 1100 includes an instruction cache 1102, one or more scheduler unit 1104 modules (e.g., such as scheduler unit 808), a register file 1106, one or more processing core 1108 modules, one or more special function unit 1110 modules, one or more load/store unit 1112 modules, an interconnect network 1114, and a shared memory/L1 cache 1116.

As described above, the work distribution unit 810 dispatches tasks for execution on the general processing cluster 900 modules of the parallel processing unit 802. The tasks are allocated to a particular data processing cluster 912 within a general processing cluster 900 and, if the task is associated with a shader program, the task may be allocated to a streaming multiprocessor 1100. The scheduler unit 808 receives the tasks from the work distribution unit 810 and manages instruction scheduling for one or more thread blocks assigned to the streaming multiprocessor 1100. The scheduler unit 1104 schedules thread blocks for execution as warps of parallel threads, where each thread block is allocated at least one warp. In an embodiment, each warp executes 32 threads. The scheduler unit 1104 may manage a plurality of different thread blocks, allocating the warps to the different thread blocks and then dispatching instructions from the plurality of different cooperative groups to the various functional units (e.g., core 1108 modules, special function unit 1110 modules, and load/store unit 1112 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1118 unit is configured within the scheduler unit 1104 to transmit instructions to one or more of the functional units. In one embodiment, the scheduler unit 1104 includes two dispatch 1118 units that enable two different instructions from the same warp to be dispatched during each clock cycle. In alternative embodiments, each scheduler unit 1104 may include a single dispatch 1118 unit or additional dispatch 1118 units.

Each streaming multiprocessor 1100 includes a register file 1106 that provides a set of registers for the functional units of the streaming multiprocessor 1100. In an embodiment, the register file 1106 is divided between each of the functional units such that each functional unit is allocated a dedicated portion of the register file 1106. In another embodiment, the register file 1106 is divided between the different warps being executed by the streaming multiprocessor 1100. The register file 1106 provides temporary storage for operands connected to the data paths of the functional units.

Each streaming multiprocessor 1100 comprises L processing core 1108 modules. In an embodiment, the streaming multiprocessor 1100 includes a large number (e.g., 128, etc.) of distinct processing core 1108 modules. Each core 1108 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1108 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1108 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1100 also comprises M special function unit 1110 modules that perform special functions (e.g., attribute evaluation, reciprocal square root, and the like). In an embodiment, the special function unit 1110 modules may include a tree traversal unit configured to traverse a hierarchical tree data structure. In an embodiment, the special function unit 1110 modules may include texture unit configured to perform texture map filtering operations. In an embodiment, the texture units are configured to load texture maps (e.g., a 2D array of texels) from the memory 820 and sample the texture maps to produce sampled texture values for use in shader programs executed by the streaming multiprocessor 1100. In an embodiment, the texture maps are stored in the shared memory/L1 cache 1116. The texture units implement texture operations such as filtering operations using mip-maps (e.g., texture maps of varying levels of detail). In an embodiment, each streaming multiprocessor 1100 includes two texture units.

Each streaming multiprocessor 1100 also comprises N load/store unit 1112 modules that implement load and store operations between the shared memory/L1 cache 1116 and the register file 1106. Each streaming multiprocessor 1100 includes an interconnect network 1114 that connects each of the functional units to the register file 1106 and the load/store unit 1112 to the register file 1106 and shared memory/L1 cache 1116. In an embodiment, the interconnect network 1114 is a crossbar that can be configured to connect any of the functional units to any of the registers in the register file 1106 and connect the load/store unit 1112 modules to the register file 1106 and memory locations in shared memory/L1 cache 1116.

The shared memory/L1 cache 1116 is an array of on-chip memory that allows for data storage and communication between the streaming multiprocessor 1100 and the primitive engine 914 and between threads in the streaming multiprocessor 1100. In an embodiment, the shared memory/L1 cache 1116 comprises 128 KB of storage capacity and is in the path from the streaming multiprocessor 1100 to the memory partition unit 1000. The shared memory/L1 cache 1116 can be used to cache reads and writes. One or more of the shared memory/L1 cache 1116, level two cache 1004, and memory 820 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1116 enables the shared memory/L1 cache 1116 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 8, are bypassed, creating a much simpler programming model. In the general purpose parallel computation configuration, the work distribution unit 810 assigns and distributes blocks of threads directly to the data processing cluster 912 modules. The threads in a block execute the same program, using a unique thread ID in the calculation to ensure each thread generates unique results, using the streaming multiprocessor 1100 to execute the program and perform calculations, shared memory/L1 cache 1116 to communicate between threads, and the load/store unit 1112 to read and write global memory through the shared memory/L1 cache 1116 and the memory partition unit 1000. When configured for general purpose parallel computation, the streaming multiprocessor 1100 can also write commands that the scheduler unit 808 can use to launch new work on the data processing cluster 912 modules.

The parallel processing unit 802 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 802 is embodied on a single semiconductor substrate. In another embodiment, the parallel processing unit 802 is included in a system-on-a-chip (SoC) along with one or more other devices such as additional parallel processing unit 802 modules, the memory 820, a reduced instruction set computer (RISC) CPU, a memory management unit (MMU), a digital-to-analog converter (DAC), and the like.

In an embodiment, the parallel processing unit 802 may be included on a graphics card that includes one or more memory devices. The graphics card may be configured to interface with a PCIe slot on a motherboard of a desktop computer. In yet another embodiment, the parallel processing unit 802 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 12:
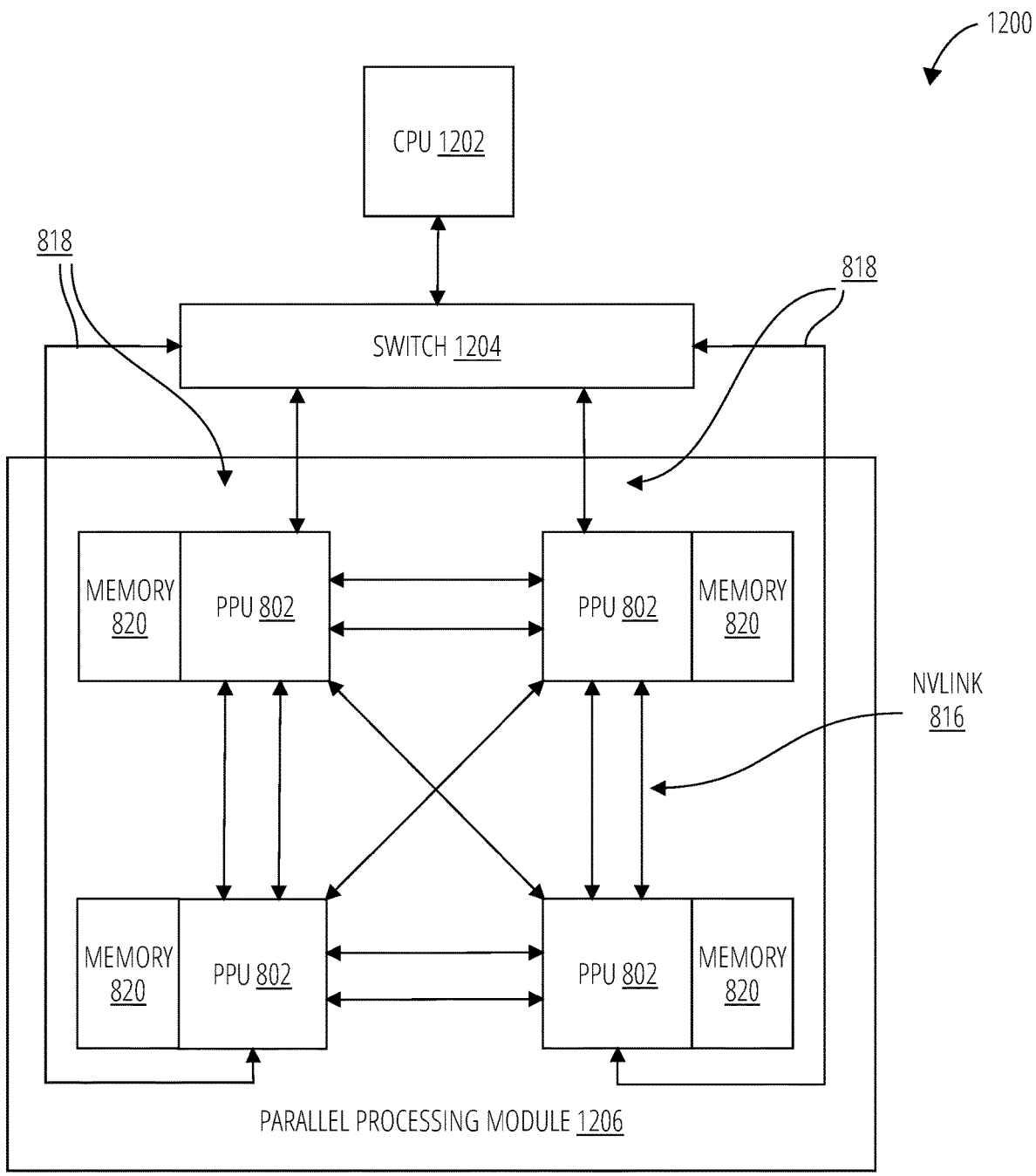
FIG. 12 depicts a processing system with one embodiment.

FIG. 12 is a conceptual diagram of a processing system 1200 implemented using the parallel processing unit 802 of FIG. 8, in accordance with an embodiment. The processing system 1200 includes a central processing unit 1202, switch 1204, and multiple parallel processing unit 802 modules each and respective memory 820 modules. The NVLink 816 provides high-speed communication links between each of the parallel processing unit 802 modules. Although a particular number of NVLink 816 and interconnect 818 connections are illustrated in FIG. 12, the number of connections to each parallel processing unit 802 and the central processing unit 1202 may vary. The switch 1204 interfaces between the interconnect 818 and the central processing unit 1202. The parallel processing unit 802 modules, memory 820 modules, and NVLink 816 connections may be situated on a single semiconductor platform to form a parallel processing module 1206. In an embodiment, the switch 1204 supports two or more protocols to interface between various different connections and/or links.

In another embodiment (not shown), the NVLink 816 provides one or more high-speed communication links between each of the parallel processing unit modules (parallel processing unit 802, parallel processing unit 802, parallel processing unit 802, and parallel processing unit 802) and the central processing unit 1202 and the switch 1204 interfaces between the interconnect 818 and each of the parallel processing unit modules. The parallel processing unit modules, memory 820 modules, and interconnect 818 may be situated on a single semiconductor platform to form a parallel processing module 1206. In yet another embodiment (not shown), the interconnect 818 provides one or more communication links between each of the parallel processing unit modules and the central processing unit 1202 and the switch 1204 interfaces between each of the parallel processing unit modules using the NVLink 816 to provide one or more high-speed communication links between the parallel processing unit modules. In another embodiment (not shown), the NVLink 816 provides one or more high-speed communication links between the parallel processing unit modules and the central processing unit 1202 through the switch 1204. In yet another embodiment (not shown), the interconnect 818 provides one or more communication links between each of the parallel processing unit modules directly. One or more of the NVLink 816 high-speed communication links may be implemented as a physical NVLink interconnect or either an on-chip or on-die interconnect using the same protocol as the NVLink 816.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1206 may be implemented as a circuit board substrate and each of the parallel processing unit modules and/or memory 820 modules may be packaged devices. In an embodiment, the central processing unit 1202, switch 1204, and the parallel processing module 1206 are situated on a single semiconductor platform.

In an embodiment, the signaling rate of each NVLink 816 is 20 to 25 Gigabits/second and each parallel processing unit module includes six NVLink 816 interfaces (as shown in FIG. 12, five NVLink 816 interfaces are included for each parallel processing unit module). Each NVLink 816 provides a data transfer rate of 25 Gigabytes/second in each direction, with six links providing 300 Gigabytes/second. The NVLink 816 can be used exclusively for PPU-to-PPU communication as shown in FIG. 12, or some combination of PPU-to-PPU and PPU-to-CPU, when the central processing unit 1202 also includes one or more NVLink 816 interfaces.

In an embodiment, the NVLink 816 allows direct load/store/atomic access from the central processing unit 1202 to each parallel processing unit module's memory 820. In an embodiment, the NVLink 816 supports coherency operations, allowing data read from the memory 820 modules to be stored in the cache hierarchy of the central processing unit 1202, reducing cache access latency for the central processing unit 1202. In an embodiment, the NVLink 816 includes support for Address Translation Services (ATS), enabling the parallel processing unit module to directly access page tables within the central processing unit 1202. One or more of the NVLink 816 may also be configured to operate in a low-power mode.

Figure 13:
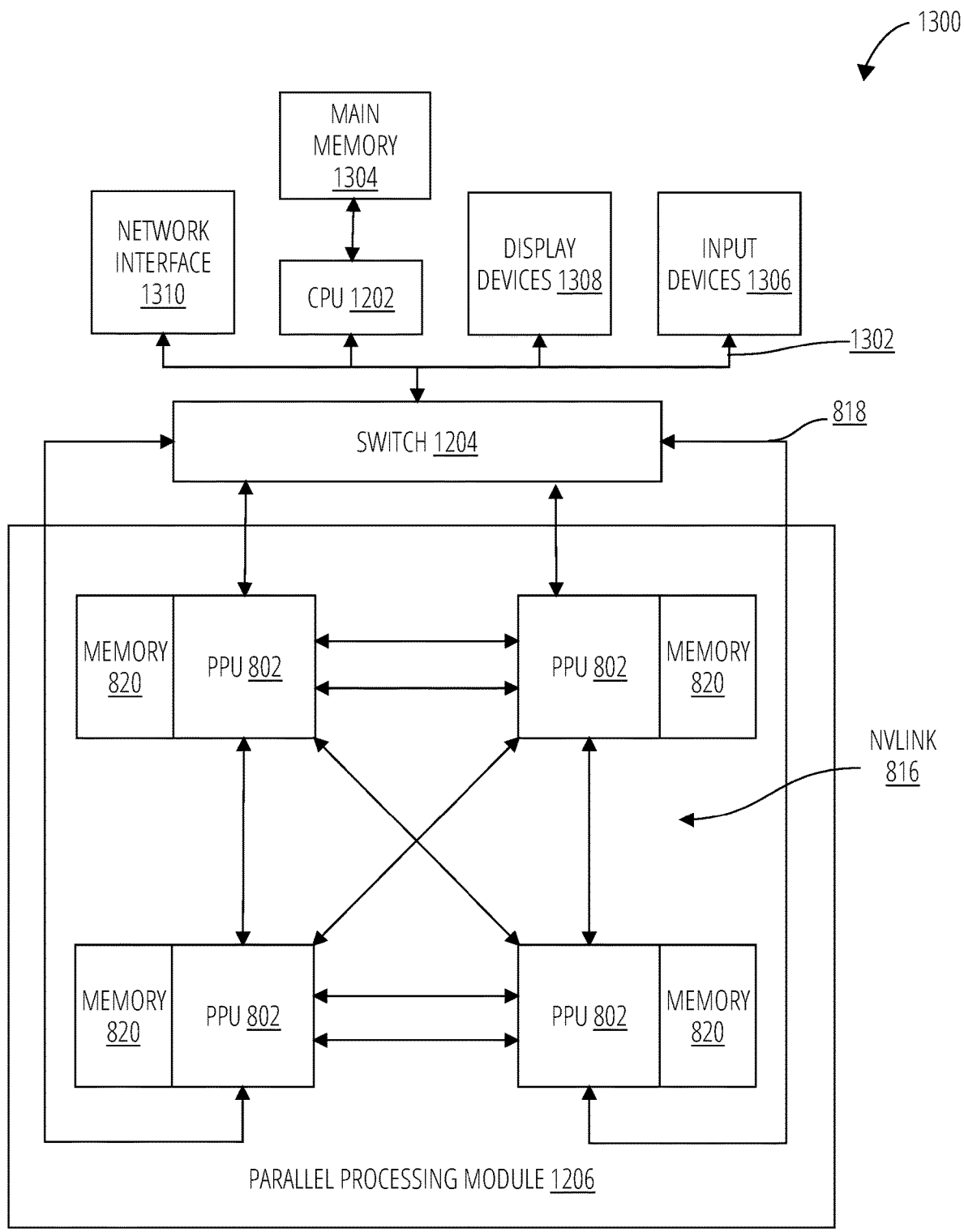
FIG. 13 depicts an exemplary processing system in accordance with another embodiment.

FIG. 13 depicts an exemplary processing system 1300 in which the various architecture and/or functionality of the various previous embodiments may be implemented. As shown, an exemplary processing system 1300 is provided including at least one central processing unit 1202 that is connected to a communications bus 1302. The communication communications bus 1302 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1300 also includes a main memory 1304. Control logic (software) and data are stored in the main memory 1304 which may take the form of random access memory (RAM).

The exemplary processing system 1300 also includes input devices 1306, the parallel processing module 1206, and display devices 1308, e.g. a conventional CRT (cathode ray tube), LCD (liquid crystal display), LED (light emitting diode), plasma display or the like. User input may be received from the input devices 1306, e.g., keyboard, mouse, touchpad, microphone, and the like. Each of the foregoing modules and/or devices may even be situated on a single semiconductor platform to form the exemplary processing system 1300. Alternately, the various modules may also be situated separately or in various combinations of semiconductor platforms per the desires of the user.

Further, the exemplary processing system 1300 may be coupled to a network (e.g., a telecommunications network, local area network (LAN), wireless network, wide area network (WAN) such as the Internet, peer-to-peer network, cable network, or the like) through a network interface 1310 for communication purposes.

The exemplary processing system 1300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage. Such computer programs, when executed, enable the exemplary processing system 1300 to perform various functions. The main memory 1304, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1300 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Graphics Processing Pipeline

Figure 14:
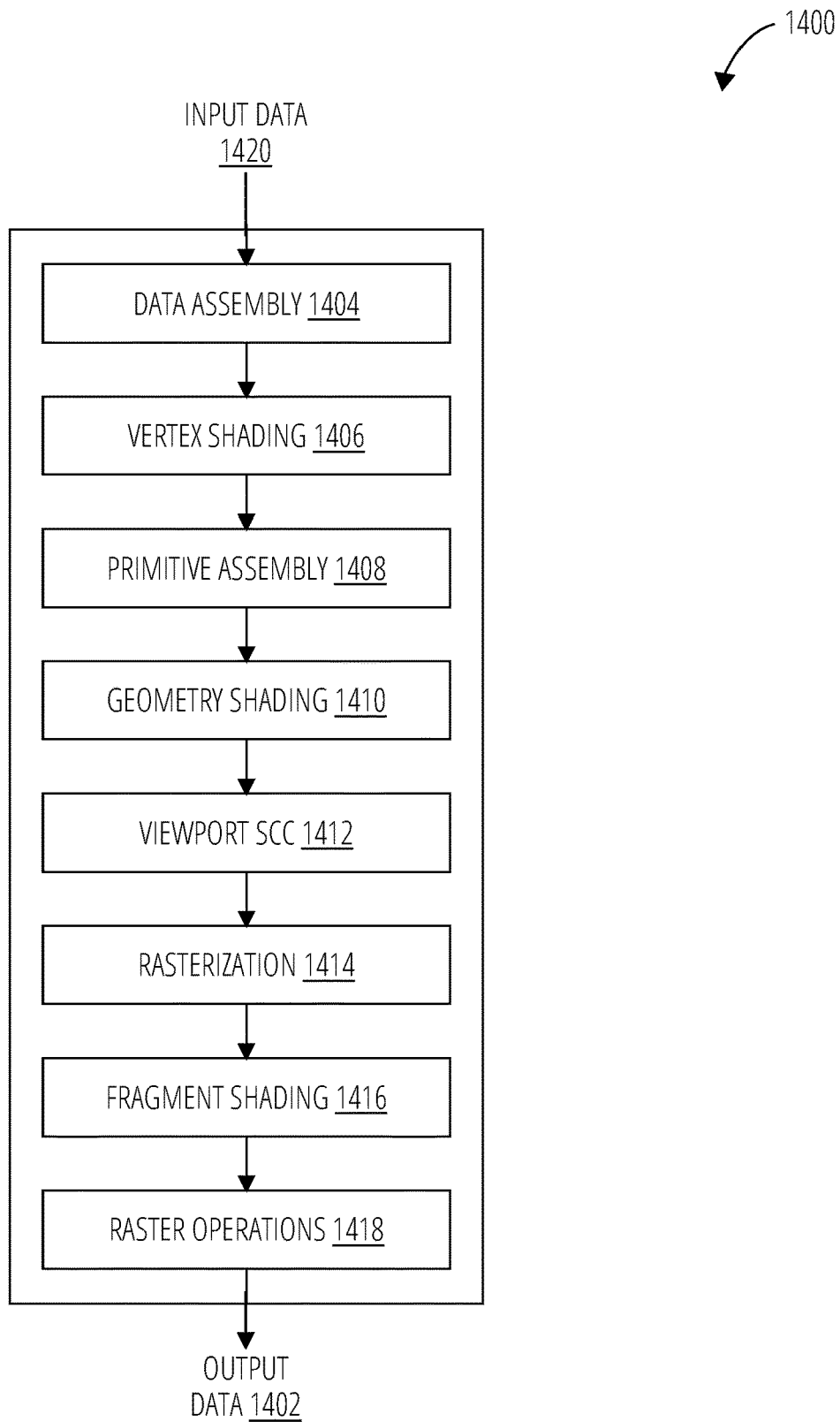
FIG. 14 depicts a graphics processing pipeline in accordance with one embodiment.

FIG. 14 is a conceptual diagram of a graphics processing pipeline 1400 implemented by the parallel processing unit 802 of FIG. 8, in accordance with an embodiment. In an embodiment, the parallel processing unit 802 comprises a graphics processing unit (GPU). The parallel processing unit 802 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 802 can be configured to process the graphics primitives to generate a frame buffer (e.g., pixel data for each of the pixels of the display).

An application writes model data for a scene (e.g., a collection of vertices and attributes) to a memory such as a system memory or memory 820. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1100 modules of the parallel processing unit 802 including one or more of a vertex shader, hull shader, domain shader, geometry shader, and a pixel shader. For example, one or more of the streaming multiprocessor 1100 modules may be configured to execute a vertex shader program that processes a number of vertices defined by the model data. In an embodiment, the different streaming multiprocessor 1100 modules may be configured to execute different shader programs concurrently. For example, a first subset of streaming multiprocessor 1100 modules may be configured to execute a vertex shader program while a second subset of streaming multiprocessor 1100 modules may be configured to execute a pixel shader program. The first subset of streaming multiprocessor 1100 modules processes vertex data to produce processed vertex data and writes the processed vertex data to the level two cache 1004 and/or the memory 820. After the processed vertex data is rasterized (e.g., transformed from three-dimensional data into two-dimensional data in screen space) to produce fragment data, the second subset of streaming multiprocessor 1100 modules executes a pixel shader to produce processed fragment data, which is then blended with other processed fragment data and written to the frame buffer in memory 820. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1400 receives input data 601 that is transmitted from one stage to the next stage of the graphics processing pipeline 1400 to generate output data 1402. In an embodiment, the graphics processing pipeline 1400 may represent a graphics processing pipeline defined by the OpenGL® API. As an option, the graphics processing pipeline 1400 may be implemented in the context of the functionality and architecture of the previous Figures and/or any subsequent Figure(s).

As shown in FIG. 14, the graphics processing pipeline 1400 comprises a pipeline architecture that includes a number of stages. The stages include, but are not limited to, a data assembly 1404 stage, a vertex shading 1406 stage, a primitive assembly 1408 stage, a geometry shading 1410 stage, a viewport SCC 1412 stage, a rasterization 1414 stage, a fragment shading 1416 stage, and a raster operations 1418 stage. In an embodiment, the input data 1420 comprises commands that configure the processing units to implement the stages of the graphics processing pipeline 1400 and geometric primitives (e.g., points, lines, triangles, quads, triangle strips or fans, etc.) to be processed by the stages. The output data 1402 may comprise pixel data (e.g., color data) that is copied into a frame buffer or other type of surface data structure in a memory.

The data assembly 1404 stage receives the input data 1420 that specifies vertex data for high-order surfaces, primitives, or the like. The data assembly 1404 stage collects the vertex data in a temporary storage or queue, such as by receiving a command from the host processor that includes a pointer to a buffer in memory and reading the vertex data from the buffer. The vertex data is then transmitted to the vertex shading 1406 stage for processing.

The vertex shading 1406 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1406 stage may manipulate individual vertex attributes such as position, color, texture coordinates, and the like. In other words, the vertex shading 1406 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1406 stage generates transformed vertex data that is transmitted to the primitive assembly 1408 stage.

The primitive assembly 1408 stage collects vertices output by the vertex shading 1406 stage and groups the vertices into geometric primitives for processing by the geometry shading 1410 stage. For example, the primitive assembly 1408 stage may be configured to group every three consecutive vertices as a geometric primitive (e.g., a triangle) for transmission to the geometry shading 1410 stage. In some embodiments, specific vertices may be reused for consecutive geometric primitives (e.g., two consecutive triangles in a triangle strip may share two vertices). The primitive assembly 1408 stage transmits geometric primitives (e.g., a collection of associated vertices) to the geometry shading 1410 stage.

The geometry shading 1410 stage processes geometric primitives by performing a set of operations (e.g., a geometry shader or program) on the geometric primitives. Tessellation operations may generate one or more geometric primitives from each geometric primitive. In other words, the geometry shading 1410 stage may subdivide each geometric primitive into a finer mesh of two or more geometric primitives for processing by the rest of the graphics processing pipeline 1400. The geometry shading 1410 stage transmits geometric primitives to the viewport SCC 1412 stage.

In an embodiment, the graphics processing pipeline 1400 may operate within a streaming multiprocessor and the vertex shading 1406 stage, the primitive assembly 1408 stage, the geometry shading 1410 stage, the fragment shading 1416 stage, and/or hardware/software associated therewith, may sequentially perform processing operations. Once the sequential processing operations are complete, in an embodiment, the viewport SCC 1412 stage may utilize the data. In an embodiment, primitive data processed by one or more of the stages in the graphics processing pipeline 1400 may be written to a cache (e.g. L1 cache, a vertex cache, etc.). In this case, in an embodiment, the viewport SCC 1412 stage may access the data in the cache. In an embodiment, the viewport SCC 1412 stage and the rasterization 1414 stage are implemented as fixed function circuitry.

The viewport SCC 1412 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1414 stage.

The rasterization 1414 stage converts the 3D geometric primitives into 2D fragments (e.g. capable of being utilized for display, etc.). The rasterization 1414 stage may be configured to utilize the vertices of the geometric primitives to setup a set of plane equations from which various attributes can be interpolated. The rasterization 1414 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1414 stage generates fragment data (e.g., interpolated vertex attributes associated with a particular sample location for each covered pixel) that are transmitted to the fragment shading 1416 stage.

The fragment shading 1416 stage processes fragment data by performing a set of operations (e.g., a fragment shader or a program) on each of the fragments. The fragment shading 1416 stage may generate pixel data (e.g., color values) for the fragment such as by performing lighting operations or sampling texture maps using interpolated texture coordinates for the fragment. The fragment shading 1416 stage generates pixel data that is transmitted to the raster operations 1418 stage.

The raster operations 1418 stage may perform various operations on the pixel data such as performing alpha tests, stencil tests, and blending the pixel data with other pixel data corresponding to other fragments associated with the pixel. When the raster operations 1418 stage has finished processing the pixel data (e.g., the output data 1402), the pixel data may be written to a render target such as a frame buffer, a color buffer, or the like.

It will be appreciated that one or more additional stages may be included in the graphics processing pipeline 1400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1410 stage). Other types of graphics processing pipelines are contemplated as being within the scope of the present disclosure. Furthermore, any of the stages of the graphics processing pipeline 1400 may be implemented by one or more dedicated hardware units within a graphics processor such as parallel processing unit 802. Other stages of the graphics processing pipeline 1400 may be implemented by programmable hardware units such as the streaming multiprocessor 1100 of the parallel processing unit 802.

The graphics processing pipeline 1400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 802. The API provides an abstraction for a programmer that lets a programmer utilize specialized graphics hardware, such as the parallel processing unit 802, to generate the graphical data without requiring the programmer to utilize the specific instruction set for the parallel processing unit 802. The application may include an API call that is routed to the device driver for the parallel processing unit 802. The device driver interprets the API call and performs various operations to respond to the API call. In some instances, the device driver may perform operations by executing instructions on the CPU. In other instances, the device driver may perform operations, at least in part, by launching operations on the parallel processing unit 802 utilizing an input/output interface between the CPU and the parallel processing unit 802. In an embodiment, the device driver is configured to implement the graphics processing pipeline 1400 utilizing the hardware of the parallel processing unit 802.

Various programs may be executed within the parallel processing unit 802 in order to implement the various stages of the graphics processing pipeline 1400. For example, the device driver may launch a kernel on the parallel processing unit 802 to perform the vertex shading 1406 stage on one streaming multiprocessor 1100 (or multiple streaming multiprocessor 1100 modules). The device driver (or the initial kernel executed by the parallel processing unit 802) may also launch other kernels on the parallel processing unit 802 to perform other stages of the graphics processing pipeline 1400, such as the geometry shading 1410 stage and the fragment shading 1416 stage. In addition, some of the stages of the graphics processing pipeline 1400 may be implemented on fixed unit hardware such as a rasterizer or a data assembler implemented within the parallel processing unit 802. It will be appreciated that results from one kernel may be processed by one or more intervening fixed function hardware units before being processed by a subsequent kernel on a streaming multiprocessor 1100.

LISTING OF DRAWING ELEMENTS 202 edge generator
204 transmitter clock
206 logic
208 chip 1
210 first voltage domain
212 logic
214 chip 2
216 second voltage domain
218 receiver clock
220 physical link circuit
222 FIFO
302 pulse generator
304 SR latch
306 OR gate 308 SR latch
502 phase locked loop
504 link transmitters
506 link receivers
508 edge generator
602 pulse generator
604 pulse generator
606 pulse generator
608
610
802 parallel processing unit
804 I/O unit
806 front-end unit
808 scheduler unit
810 work distribution unit
812 hub
814 crossbar
816 NVLink
818 interconnect
820 memory
900 general processing cluster
902 pipeline manager
904 pre-raster operations unit
906 raster engine
908 work distribution crossbar
910 memory management unit
912 data processing cluster
914 primitive engine
916 M-pipe controller
1000 memory partition unit
1002 raster operations unit
1004 level two cache
1006 memory interface
1100 streaming multiprocessor
1102 instruction cache
1104 scheduler unit
1106 register file
1108 core
1110 special function unit
1112 load/store unit
1114 interconnect network
1116 shared memory/L1 cache
1118 dispatch
1200 processing system
1202 central processing unit
1204 switch
1206 parallel processing module
1300 exemplary processing system
1302 communications bus
1304 main memory
1306 input devices
1308 display devices
1310 network interface
1400 graphics processing pipeline
1402 output data
1404 data assembly
1406 vertex shading
1408 primitive assembly
1410 geometry shading
1412 viewport SCC
1414 rasterization
1416 fragment shading
1418 raster operations
1420 input data Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A circuit comprising:
   at least one line transmitter;
   a first clock configured to operate synchronous elements of the circuit that supply the at least one line transmitter with data; and
   an edge generator configured to generate first multiplied edges of the first clock and to apply the first multiplied edges to serializer elements of the at least one line transmitter, wherein the edge generator is configured to be enabled and disabled by application of a valid data signal.

2. The circuit of claim 1, comprising multiple line transmitters, and configured to apply the first multiplied edges to each of the multiple line transmitters.

3. The circuit of claim 1, wherein the edge generator is configured to generate second multiplied edges of the first clock at a phase offset from the first multiplied edges.

4. The circuit of claim 3, configured to forward the second multiplied edges over a link to a receiver.

5. The circuit of claim 1, the edge generator comprising a plurality of serialized delay stages.

6. The circuit of claim 5, one or more of the delay stages comprising a configurable delay element.

7. The circuit of claim 5, the edge generator comprising an oscillator formed by a pulse feedback path between at least two of the serialized delay stages, and a counter configured to control the oscillator.

8. The circuit of claim 5, one or more of the delay stages comprising a pulse extender.

9. The circuit of claim 5, wherein outputs of alternate ones of the serialized delay stages are configured as input pairs to different latches.

10. A serial communication interface comprising:
    a transmitter;
    a receiver;
    a physical link circuit comprising serial links between the transmitter and the receiver;
    a first clock configured to operate synchronous elements of the transmitter; and
    an edge generator configured to generate first multiplied edges of the first clock and to apply the first multiplied edges to drive the serial links of the physical link circuit, the edge generator comprising a plurality of serialized delay stages.

11. The serial communication interface of claim 10, wherein the edge generator is configured to be enabled and disabled by application of a valid data signal.

12. The serial communication interface of claim 10, the physical link circuit configured to apply the first multiplied edges to line transmitters for the serial links.

13. The serial communication interface of claim 10, the edge generator configured to generate second multiplied edges of the first clock at a phase offset of the first multiplied edges.

14. The serial communication interface of claim 13, the physical link circuit configured to forward the second multiplied edges over a link to the receiver.

15. The serial communication interface of claim 10, the edge generator comprising an oscillator formed by a pulse feedback path between at least two of the serialized delay stages, and a counter configured to control the oscillator.

16. The serial communication interface of claim 10, one or more of the delay stages comprising a configurable delay element.

17. The serial communication interface of claim 10, one or more of the delay stages comprising a pulse extender.

18. The serial communication interface of claim 10, wherein outputs of alternate ones of the serialized delay stages are configured as input pairs to different latches.

19. A serial data communication method comprising:
    transforming a first clock signal through an edge generator to multiply edges of the first clock into a transmitter link clock and a forward clock to a receiver;

wherein a base frequency of the link clock and forwarded clock are determined by a frequency of the first clock; and the link clock and the forwarded clock having a phase offset.

20. The serial data communication method of claim 19, wherein the edge generator comprises a daisy-chain of delay stages, each of the delay stages comprising a pulse extender.

* * * * *